United States Patent Office 3,817,8
Patented June 18, 1!

3,817,875
HEAVY-DUTY MULTI-PURPOSE CLEANER
Jose Bazán, 1998 Rte. 112, Apt. 46A,
Coram, N.Y. 11727
Filed Apr. 28, 1971, Ser. No. 138,360
Int. Cl. C11d 1/18
U.S. Cl. 252—527                         1 Claim

ABSTRACT OF THE DISCLOSURE

A heavy-duty, multi-purpose cleaner containing the following active ingredients:

A. Approximately 75% by weight of a combination of ammonium oxalate, hexachlorophene, 2,2'-methylene-bis-(3,4,6-Trichlorophenol) and ammoniumethylene diamine tetraacetate in the approximate ratio of 6:1.5:1, with a minor amount of ammonium ortho-phenylphenate;

B. Approximately 20% by weight of a tertiary N-higher alkyl-dimethylbenzyl ammonium chloride combined with anhydrous sodium metasilicate in the ratio 2:3; and C. Approximately 5% by weight of water.

When these ingredients are compounded, and inert and other known ingredients are added to the above mass 96% to 98% by weight, a creamy composition is obtained having a much higher cleaning effectiveness than the sum of the active components.

---

The present invention relates to heavy-duty, multi-purpose cleaners for cleaning badly soiled surfaces, such as tiles, bathrooms and showers, swimming pools, and garages. It can be used to clean ceramic covered surfaces, cement floors and surfaces made or covered with stainless steel. While its primary purpose is not as a skin cleaner, it is also useful as a hand cleanser and may even be applied to clothing.

Although many detergents and cleansers are frequently available for the cleaning purposes mentioned above, it is of increasing concern that detergents be manufactured of ingredients which do not contribute to the already present pollution problems. In particular, phosphates must be eliminated from detergents so as to reduce pollution of water supplies.

It is therefore an object of the present invention to provide a cleanser which is highly effective in small amounts and whose ingredients will not contribute to further pollution of the environment.

It is another object to provide a multi-purpose cleaner which will, in a single application, remove heavy stains and grime from surfaces of various materials and produce a shiny surface without polishing.

It is another object of the present invention to provide a multi-purpose cleaner which is simple in its make-up, easy to manufacture, and efficient and reliable in operation.

Other objects and features of the present invention will become apparent from the following detailed description which discloses one embodiment of the present invention.

Accordingly, the invention provides a mixture of ingredients which dissolve grease, paint, dirt, tar and similar stains and also act effectively as disinfectants and germicides, the mixture also including deodorants, brighteners and colorants.

The cleaner further contains a large amount of known fillers, some of which are chemically inert substances which add bulk to the mixture, while others contribute to its effectiveness as a wetting agent and emulsifying agent and enhance its fragrance. Water is also present in the mixture.

Generally, the mixture should contain the follo\ components in approximate amounts:

A. Approximately 75% by weight of a combina of ammonium oxalate, hexachlorophene (2,2' methyl bis-(3,4,6-trichlorophenol), and ammonium ethylene amine tetraacetate, in the approximate ratio of 6:1 with a minor amount of ammonium orthophenyl phei B. Approximately 20% by weight of a tertiary N-hi alkyl-dimethylbenzyl ammonium chloride combined anhydrous sodium metasilicate, the two ingredients in approximate ratio of 2:3;

C. Approximately 5% by weight of water.

The term "higher alkyl" previously recited abov "B," denotes higher hydrocarbon groups having c lengths from $C_{12}$ to $C_{16}$, with $C_{14}$ being present appi mately 50% by weight.

The ingredients mentioned under "A" and "B" stirred together with the water, until a smooth pas obtained. The inert ingredients are then gradually ad and a creamy preparation results which may thei bottled in glass or plastic containers.

The following example describes the invention 1 specifically, but it should be understood that it is ε by way of illustration and not of limitation and that n modifications of the details can be made without de; ing from the spirit of the invention.

EXAMPLE (All parts are by weight)

Two clean dishes are prepared for receiving the ponents of Mixture A and B respectively.

Into the first dish are weighed the active ingred of A, namely:

1.5 parts of Ammonium oxalate
.37 parts of Hexachlorophene
.25 parts of Ammonium ethylene diamine tetraacetal
.03 parts of Ammonium ortho-phenylphenate.

Water is added drop by drop until a smooth pa; obtained. From this paste, containing the active ing ents, the cleaning preparation A is then prepared by bination with "inert" ingredients in an amount of app mately 97% by weight, depending on the amount of \ added to make the paste. The total weight of A is parts; 75% of A is then taken to prepare the clε according to the invention.

Into the second dish, are weighed the ingredients f ing the mixture B, namely:

2 parts of Sodium metasilicate
3 parts of N-higher alkyl-dimethylbenzyl ammo; chloride.

These ingredients are stirred while gradually adding ς amounts of water to form the second paste. The ingredients are then added in an amount of aboι parts, depending on the amount of water added. The weight of B is again 100 parts; 20% of B is then ι and thoroughly mixed with the 75% of mixture . necessary, a few more parts of water are added so the mixture becomes a thick, creamy mass. The mi may then be bottled in glass or plastic containers. If p containers are used, an adequate amount of cleaner be squeezed from the container directly onto the sp area to be cleaned, allowed to stand for a few miι and then removed by rubbing with a dampened sp. When the excess water is removed, the surface wi clean and have a bright shine. When heavily soiled are to be cleaned and glass containers are used, cleː with a scrubbing brush will be necessary. Howev clean and shining surface will eventually be obtaineι

While only one embodiment of the present invention has been described, it will be obvious that many changes and modifications may be made thereunto without departing from the spirit and scope of the invention.

What I claim is:

A heavy-duty multipurpose cleaner in the form of a thick creamy paste consisting essentially of the following ingredients, all percentages and parts being by weight:

about 75% of a mixture of approximately
(a) 1.5 parts ammonium oxalate
(b) 0.37 parts 2,2'-methylenebis-(3,4,6-trichlorophenol)
(c) 0.23 parts ammonium ethylenediamine tetraacetate
(d) 0.03 parts ammonium orthophenyl phenate
(e) 97.85 parts inert materials about 20% of a mixture of approximately
(f) 2 parts sodium metasilicate
(g) 3 parts N-higher alkyl dimethyl benzyl ammonium chloride
(h) 94 parts inert materials C. about 5% total water.

References Cited

UNITED STATES PATENTS

| | | | |
|---|---|---|---|
| 2,138,805 | 11/1938 | Halvorson | 252—GD |
| 2,287,050 | 6/1942 | Miller | 252—142 |
| 2,474,412 | 6/1949 | Bersworth | 252—528 |
| 2,850,460 | 9/1958 | Ginn et al. | 252—546 |
| 3,218,140 | 11/1965 | Francel et al. | 65—27 |

JOHN D. WELSH, Primary Examiner

U.S. Cl. X.R.

252—546